United States Patent [19]

Guernet et al.

[11] 3,906,225

[45] Sept. 16, 1975

[54] X-RAY SPECTROMETER

[75] Inventors: Jacques Guernet; Pierre Boissel, both of Courbevoie, France

[73] Assignee: Compagnie d'Applications Micaniques a l'Electronique (CAMECA), Courbevoie, France

[22] Filed: Dec. 13, 1973

[21] Appl. No.: 424,425

[30] Foreign Application Priority Data
Dec. 19, 1972 France .............................. 72.45248

[52] U.S. Cl. ................................ 250/272; 250/278
[51] Int. Cl. .......................................... G01n 23/20
[58] Field of Search ........... 250/280, 272, 273, 274, 250/278

[56] References Cited
UNITED STATES PATENTS
3,486,021  12/1969  Houme .............................. 250/280

*Primary Examiner*—Eli Lieberman
*Assistant Examiner*—C. E. Church
*Attorney, Agent, or Firm*—Cushman, Darby & Cushman

[57] ABSTRACT

In an X-ray spectrometer, where the analyser crystal is, conventionally, mounted on a support plate at a first end thereof, the first and second ends of the support plate having translational motions respectively along first and second intersecting axes, the detector is carried by a link, two points of which are constrained to remain on respective circles of the support plate, one of them by means of an arm rotatably mounted on the support plate. The correct position of the detector for a given position of the analyser is achieved by means of a gear coupling the arm to a member mounted for translating parallel to the second axis, the support plate being, at its second end, rotatably coupled to this member.

7 Claims, 3 Drawing Figures

X-RAY SPECTROMETER

The present invention relates to a spectrometer for X-ray analysis and relates more particularly to a mechanical arrangement for driving the detector of the spectrometer.

As those skilled in the art will appreciate, an X-ray monochromator spectrometer essentially comprises a crystal analyser and an X-ray detector (proportional counter or scintillation counter for example). It is well known that if, tangentially to a circle of radius R passing through the X-ray source, there is disposed a crystal whose reticular planes have a radius of curvature 2R, and that if the conditions of selective reflection are satisfied, the monochromatic radiation diffracted by the crystal will be focussed at a point on this circle which is referred to as the Rowland circle.

Generally, the position of the X-ray source being fixed, the crystal is driven radially in relation to the source in order to analyse the X-ray radiation coming therefrom in a given direction.

To this end, the crystal is integral with a support plate, two end points of which are allowed to move respectively along first and second axes intersecting at the source. The Rowland circle is then integral with the support plate (while the point thereof coinciding with the source depends upon the position of the support plate).

As for the detector, it may be carried by a mechanism articulated about an axis passing through the first end of the support plate; this arrangement results in complex and expensive mechanisms. In a simpler arrangements, an arm carrying the detector is rotatably mounted about a pivot located at the centre of the Rowland circle; this arrangement is not always suitable, in particular if the source whose X-ray radiation is to be analysed is excited by electron bombardment and is accordingly located in an evacuated enclosure; since the crystal and the detector are arranged outside this enclosure, the centre of the Rowland circle may not be accessible at certain crystal positions.

In order to overcome this drawback, it has been proposed in U.S. Pat. No. 3,445,653 to use a mechanism comprising an arm rotatably mounted relatively to the support plate about a point of the support plate distinct from the centre of the Rowland circle, a link, with which the focusing centre of the detector is integral, rotatably mounted, relatively to the arm, about a point of the arm at a distance R from the rotation centre of the arm, a rotation control system for rotating the arm relatively to the support plate as a function of the position of the latter, and an articulated triangle of which the link forms one side, the apex of the triangle opposed thereto being integral with the arm, and the other two apices of the triangle sliding in a guide, the rotation of which, relatively to the support plate, is also controlled by the aforesaid rotation control system.

However, this known arrangement has limited accuracy and stability because of the fact that the system controlling the rotation of the arm as a function of the position of the support plate is based upon causing a certain distance in the mechanism to become equal to a variable length depending upon the position of the support plate, so that this rotation control system comprises a tension member wrapped about a system of pulleys. In addition the known arrangement leaves a portion of the detector driving arrangement in the vicinity of the analyser crystal.

The object of the invention is to obviate the aforesaid drawbacks.

According to the invention, there is provided an X-ray spectrometer comprising: a support plate having first and second end points mounted for translating along first and second fixed translation axes respectively, said translation axes being at an angle to each other; an analyser crystal mounted on said support plate, and having a point coincident with said first end point; a member mounted for translating parallel to said second translation axis, said support plate being rotatably mounted relatively to said member about a first rotation axis passing through said second end point; a main arm rotatably mounted relatively to said support plate about a second rotation axis intersecting said support plate at a further point thereof distinct from the centre of the Rowland circle defined by said two end points and the point of intersection of said two translation axes; a link rotatably mounted, relatively to said arm, about a third rotation axis, the distance between said second and third rotation axes being equal to the radius R of the Rowland circle; an X-ray detector, a predetermined point of which is fixed relatively to said link; further means for causing said link to have a fixed orientation relatively to said support plate; and a mechanical coupling between said arm and said member for causing said arm to rotate relatively to the support plate by an angle double from the rotation angle of the rotation component of the motion of said support plate relatively to said second translation axis.

The invention will be better understood, and other of its features rendered apparent, from a consideration of the ensuing description and the appended drawing in which.

Figure 1:
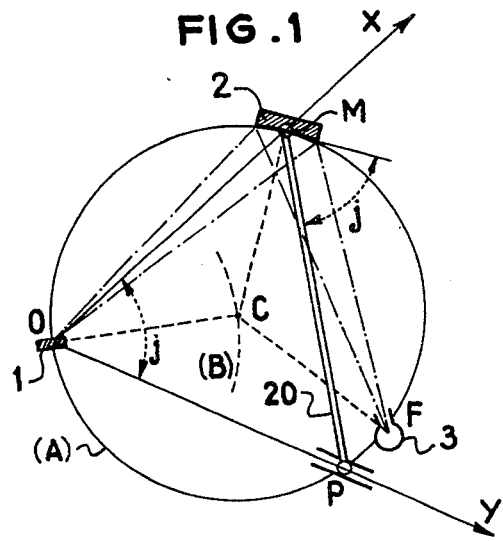
FIG. 1 is a diagram illustrating the principle of a curved crystal spectrometer for X-ray analysis.

In FIG. 1, the three chief elements involved in X-ray spectrometry, namely an X-ray source 1 arranged at O, a curved crystalline plate 2 centered at M and having a radius of curvature of 2 R, and an X-ray detector 3, have been shown. In a conventional manner, the crystal is disposed tangentially to the circle (A) of radius R passing through the source point O and the centre M of the crystal, so that the X-ray radiation diffracted by the crystal is focused at a point F on the circle (A) which is the Rowland circle. Chain dotted lines have been used in the drawing to illustrate the extreme rays of the beam emitted by the source, diffracted by the crystal and focused at the point F. The input of the detector 3 is located at the focal point F or close thereto.

Two axes OX and OY, fixed in relation to the source 1 have been shown, the axis OX passing through the centre M of the crystal. As indicated hereinbefore, in order to analyse the radiation from the source in a given direction, the centre M of the crystal describes a rectilinear trajectory passing through the source, this trajectory here being the straight line section OX, and being the analysis direction; with each position of the crystal, for which the distance OM is less than 2 R, there corresponds a position on the Rowland circle which is that of the circle of radius R passing through e source and through the particular point occupied by the centre of the crystal. As the crystal displaces along the straight line OX, the centre C of the Rowland circle describes an arc (B) along the circle centred at , of radius R.

The crystal is maintained tangential to the Rowland circle by means of a known mechanical arrangement. This mechanism comprises a support plate 20 articulated at two points, spaced by a distance $2R \sin j$, where $j$ is the angle formed by the axes OX, OY. One of the two articulation points is the point M and the other a point P moving along the axis OY, this point P describing part of the axis OY, when the point M displaces along OX. It can readily be seen that for all the positions of the point M, the point P is on the Rowland circle, and that consequently the Rowland circle (A) and its centre C are fixed in relation to the segment PM and to the support plate 20. The correct orientation of the crystal is achieved by fixing the latter to the support plate 20 and by arranging it tangentially to a direction which makes an angle $j$ with the segment PM.

In addition, it will be observed that the angle formed by the directions PM and PO is equal to half the angle formed by the radii CM and CO and therefore half that which is formed by the radii CF and CM, the points O and F being symmetrical to one another in relation to the radius CM.

Figure 2:
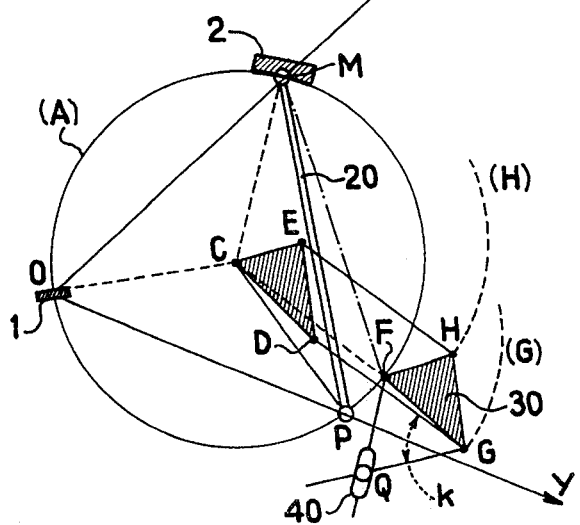
FIG. 2 is a diagram explaining the operation of a spectrometer in accordance with the invention.

In FIG. 2, where the same letters as in FIG. 1 are used to designate the same elements, the basic diagram of a spectrometer in accordance with the invention has been shown.

In this Figure, D and E are two points which are fixed in relation to the plate 20, the latter being symbolically indicated by the segment PM, and therefore fixed relatively to the centre C of the Rowland circle. The segment DE forms one of the sides of a triangle CDE fixed relatively to the plate 20. The triangle FGH is a triangle deriving from the triangle CDE by a translation, so that the following relationships of equality are obtained: EH = DG = R, and DE = GH, the points D, E, G, and H being arranged at the four apices of a parallelogram.

As the point F displaces along the circle (A), the points H and G, relatively to the support plate 20, describe trajectories (H) and (G) which are circular arcs forming parts respectively of a circle of radius R and centre E, and of a circle of radius R and centre D. Conversely, if the points H and G are moved along the trajectories (H) and (G) hereinbefore referred to, the point F describes the circle (A).

Self-evidently, for the apex F of the triangle FGH to coincide with the focal point F hereinbefore defined, it is essential that the condition of symmetry of the points F and O in relation to the radius CM, should be satisfied, that is to say that the angle formed by the radius CF (or one or the other of the segments DG and EH) and the radius CM, should be equal to the angle formed by the radii CM and CO or, more particularly equal to twice the angle formed by the directions PO and PM. The triangle FGH is physically embodied by a component 30; the guidance of the point F along the Rowland circle is achieved by guiding the points H and G along trajectories (H) and (G) using appropriate guide means.

The drive to the component 30 and the positioning of the point F, are achieved by means of a drive mechanism linking the movement of the triangle FGH with the movement of the end P of the support plate.

This latter arrangement has the feature of liberating the zone surrounding the point M and the crystal, of all the conventional drive devices, these latter instead being shifted to a position in the proximity of the point P; on the one hand, this makes the analyser crystal more accessible for operations of adjustment, and on the other hand leads to a smaller size on the part of the mechanism, in the direction perpendicular to the plane of the Rowland circle, to the extent that certain elements of the mechanism can be arranged in the same plane as the Rowland circle without disturbing the operation of the spectrometer.

In the example illustrated in FIG. 2, the devices for guiding the points G and H, are constituted by two arms DG and EG of length R, articulated to the support plate 20 respectively at D and E, and to the component 30 respectively at G and H, said arms being symbolically represented by the segments DG and EH in the drawing. The assembly of these elements forms an articulated parallelogram DEHG.

The driving and positioning of the component 30, and consequently the positioning of the detector at the correct point, are achieved by means of one of the two arms, EH or DG, and by means of a rotary drive arrangement, not shown in FIG. 2, which maintains this arm in a direction forming with the segment CM an angle double of the angle formed by the directions PO and PM and which, at the time of displacement of the crystal, causes this arm to rotate relatively to the segment CM (that is to say relatively to the plate 20), by an angle which is twice the variation in the angle formed by the directions PO and PM.

The detector 3, not shown in the drawing, is designed to be orientated so that its input is located in proximity of the point F.

In order to suitably orientate the detector about the point F, the component 30 is provided with a point of articulation coincidental with the point F; the component 40 symbolically illustrated by a segment in the drawing, is rotatable about said point of articulation. The detector 3, is fixed to said component 40, at the point F, so that it can be orientated in relation to the component 30.

One of the arms of the parallelogram DEHG, the arm DG in the case shown in FIG. 2, has a point of articulation Q integral with the arm DG and located at a distance from the point G equal to the length FG, the segment GQ making an angle $k$ with the segment GD. The component 40 contains a groove disposed radially in relation to the point F; this groove receives a shaft centred at Q so that the component 40 can rotate in relation to the arm DG, about the point Q, and also have a translation motion relatively to this point Q. The component 40 physically embodies the base FQ of an isosceles triangle GFQ. When the contour of the parallelogram DEHG varies, that of the isosceles triangle GFQ also varies, the two equal sides FG and GQ retaining the same length but the apex angle FĜQ and the length of the FQ varying.

Single geometrical considerations show that, due to the fact that the triangle GFQ remains isosceles, the angle between the segment FQ and the direction FM of the diffracted beam maintains a constant value when the analyser crystal displaces. The detector 3 is first orientated in the direction of the crystal for one of the positions of the latter, and then secured to the plate 40, this arrangement ensuring correct orientation of the detector whatever the crystal position.

What has been said in the foregoing is unaffected by the choice of the points D and E on the support plate, the positions of these points being chosen as a function of various technological considerations; the positions of these two points can, in particular, be chosen so that the mechanism has a reduced size, or so as to obtain a larger range of displacement for the analyser crystal. Similarly, the value of the angle $\hat{k}$ formed by the segments GD and GQ on the arm GD can be chosen in order to produce a mechanism of small size.

It should be pointed out that the guiding of the component 30 can be effected by means other than the articulated parallelogram of FIG. 2, since it is merely necessary that each of the points G and H should be constrained to move, relatively to the support plate, along an arc of a circle of radius R, guidance of a point along such a trajectory being possible by means of a link, a slide or a roller device. Apart from an articulated parallelogram, it would be possible, for example, to utilise a link and a slide, or again a link and a roller device. The embodiment of a spectrometer illustrated by way of example in FIG. 3 is of the latter kind:

The guidance of the point G is here effected by means of an articulated arm and the guidance of the point H by means of a roller device.

Figure 3:
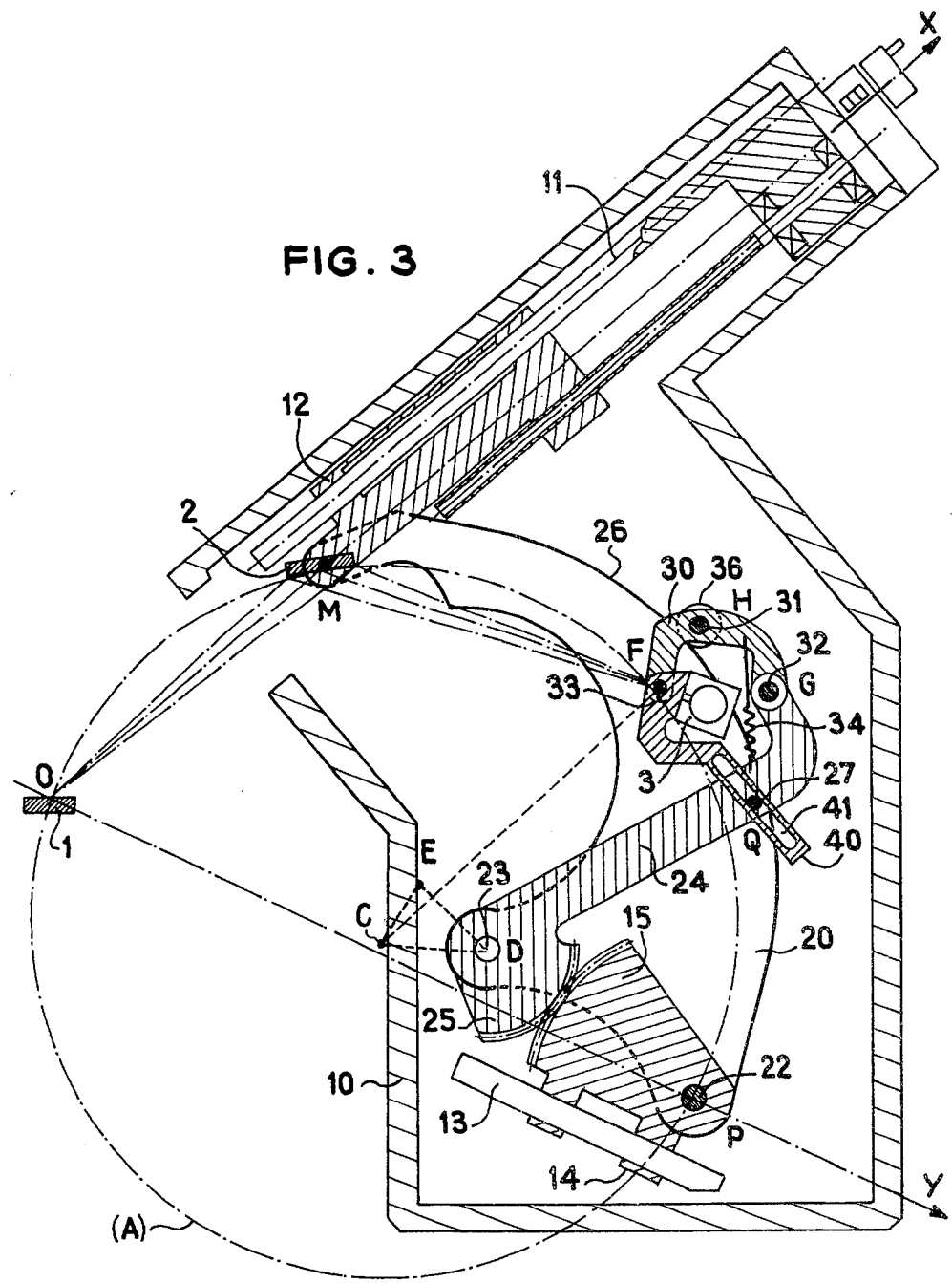
FIG. 3 is the diagram of an embodiment of a spectrometer in accordance with the invention.

In FIG. 3, the reference letters or numbers are associated with the similarly marked elements of the preceding figures; in particular, at O, M and F, the X-ray source 1, the crystal analyser 2 and the detector element 3, all located in the same plane (T) which is a plane defined by the axes OX and OY and in which the Rowland circle (A) moves have been shown.

The spectrometer comprises a frame 10 fixed in relation to the source 1, whose radiation is to be analysed, a window being formed in the frame to pass the radiation emitted by the source in the direction OX; a first slide 11, disposed parallel to the axis OX and a second slide 13 disposed parallel to the axis OY, are fixed to said frame. A first carriage 12 is supported by the slide 11 and driven by a control device. In the example shown in FIG. 3, the control device embodies a screw-and-nut system which can be operated by a motor or by means of a crank. A second carriage 14, supported on the slide 13, is able to translate in relation to the slide 13 and the frame. The two carriages 12 and 14 respectively carry shafts 21 and 22 whose axes are perpendicular at M and P to the plane (T). The two carriages are coupled through the support plate 20 which is articulated about the shafts 21 and 22 and maintains a constant interval between the axes of said shafts, so that the effective positioning of the axes at the geometric points P and M hereinbefore defined, is ensured. When the carriage 12 is displaced by the control device, the support plate 20 also displaces and entrains the second carriage 14.

The support plate is equipped with a crystal mounting designed to maintain the crystal with a radius of curvature 2 R centred at the point M, in the proper orientation relatively to the support plate.

The support plate has a convex cylindrical portion 26 whose axis is perpendicular, at E, to the plane (T), and whose radius R' is smaller than the radius R of the Rowland circle.

The support plate also carries a shaft 23 whose axis is perpendicular to the plane of the Rowland circle at a point D, this point D having been chosen, in the desired example, in such a manner as to make it possible to achieve compactness. An arm 24 is rotatably mounted at one of its ends, about shaft 23; this arm 24 comprises a toothed sector 25 forming a cylindrical gear portion whose axis is coincidental with that of the shaft 23. The toothed sector 25 meshes with a toothed sector 15 fixed to the carriage 14, forming a cylindrical gear portion whose axis is coincidental with that of the shaft 22 at the point P. The toothed sector 15 has a radius twice that of the toothed section 25, so that when the support plate 20 rotates through an angle $\theta$ relatively to the direction of the slide 13, consequent upon a displacement of the carriage 12, the arm 24, driven by its toothed sector 25, rotates in the same direction through twice the angle, 2 $\theta$, relatively to the support plate 20. Assuming the initial orientation of the arm 24 to be correct this drive system ensures, as indicated hereinbefore, that the arm 24 (and consequently, the straight line portion CF) is correctly orientated whatever the position of the crystal.

At its second end, the arm 24 carries a shaft 22 located at the distance R from the shaft 23, and with its axis perpendicular to the plane (T) at the point G, the arm 24 physically embodying one of the sides of the parallelogram DGHE. When the arm 24 is made to rotate, it drives the point G along a circular trajectory of radius R centred at D, that is to say along the trajectory (G).

A link constituting the component 30 hereinbefore defined, is rotatably mounted about the shaft 32; this link 30 is equipped with a roller 36 carried by the shaft 31 whose axis is perpendicular to the plane (T) at the point H. A spring 34, connects the link 30 to the arm 24 and maintains the roller 36 in contact with the cylindrical surface 26 of the support plate. When the assembly is in motion, the arm 24 drives the link 30 and the roller follows the cylindrical surface 26; the radius of the roller 36 and the radius of curvature R' of the cylindrical surface 26 are chosen so that their sum is equal to the radius R, the point H located on the axis 31 of the roller describing part of a circular arc of radius R centred at E, that is to say the trajectory (H), so that the side EH of the parallelogram system need not be a physically embodied in order to produce this result.

In a variant embodiment, the guidance of the point H is achieved by means of a circular slide formed in the support plate, the central longitudinal line of this slide being coincidental with the trajectory (H), these guide means for the point H having the advantage that the point E need not be given a material form; this arrangement makes it possible to utilise a support plate of smaller size so that, as the example of FIG. 3 shows, it is possible for the crystal to achieve positions in respect of which the centre of the Rowland circle and the point E are located outside the frame of the spectrometer.

The link 30 on which the three apices of the triangle FGH are located, is provided at its end with a shaft 33 whose axis is perpendicular to the plane (T) at the point F. A lever 40 integral with the detector 3 is rotatably mounted about the shaft 33; this lever is provided with a guide groove 41 of rectilinear shape, the longitudinal axis of which passes through the point F. A pivot 27 fixed to the arm 24 engages in the groove 41. The pivot 27 is disposed perpendicularly to the plane (T) at a point located at a distance from the point G equal to the distance separating the points F and G, the point Q ving been chosen, in the described example, so as to achieve compactness.

The lever 40 comprises adjuster devices which make possible to adjust the orientation of the detector in relation to the lever, those devices not having been illustrated in the drawing.

The link 30, two points H and G of which are guided along circular trajectories, constitutes, in association with a drive mechanism driving one of the two points (which mechanism here is formed by the arm 24 and the gear system 25 – 15), the device for driving the detector, the device for orientating the detector being formed by the lever 40 fixed to the detector and articulated at the point F.

The invention is not limited to the embodiment described here. Various other embodiments can be created by combining the various known guide means used to guide a point along a circular trajectory, in pairs. In certain of these variant embodiments, in which, due to the nature of the guide device used, one of the points D or E, is not physically embodied (this being the case for example with the point E in FIG. 3), it is possible to arrange for this particular point to be coincidental with the point C representing the centre of the focusing circle, the choice of the second point making it possible to retain the advantages of the invention.

Of course, the invention is not limited to the embodiments described and shown which are given solely by way of example.

What is claimed, is:

1. An X-ray spectrometer comprising: a support plate having first and second end points mounted for translating along first and second fixed translation axes respectively, said translation axes being at an angle to each other; an analyser crystal mounted on said support plate, and having a point coincident with said first end point; a member mounted for translating parallel to said second translation axis, said support plate being rotatably mounted relatively to said member about a first rotation axis passing through said second end point; a main arm rotatably mounted relatively to said support plate about a second rotation axis intersecting said support plate at a further point thereof distinct from the centre of the Rowland circle defined by said two end points and the point of intersection of said two translation axes; a link rotatably mounted, relatively to said arm, about a third rotation axis, the distance between said second and third rotation axes being equal to the radius R of the Rowland circle; an X-ray detector, a predetermined point of which is fixed relatively to said link; further means for causing said link to have a fixed orientation relatively to said support plate; and a mechanical coupling between said arm and said member for causing said arm to rotate relatively to the support plate by an angle double from the rotation angle of the rotation component of the motion of said support plate relatively to said second translation axis.

2. A spectrometer as claimed in claim 1, wherein said mechanical coupling is formed by the two elements of a cylindrical gear, one of said elements being integral with said arm and the other one being integral with said member.

3. A spectrometer as claimed in claim 1, wherein said further means are guiding means for guiding a point on said link, relatively to said support plate, along a circle of radius R whose centre is distinct from said further point.

4. A spectrometer as claimed in claim 3, wherein said guiding means comprises a cylindrical surface formed on said support plate, a roller movable about a pivot passing through said point on said link, and a device keeping said roller in contact with said cylindrical surface.

5. A spectrometer as claimed in claim 3, wherein said guiding means comprises a circular slide formed in said support plate.

6. A spectrometer as claimed in claim 3, wherein said guiding means comprises an auxiliary arm rotatably mounted relatively to said support plate, about a fourth rotation axis, said link being rotatably mounted, relatively to said auxiliary arm, about a fifth rotation axis, the distance between said second and fourth rotation axes being equal to the distance between said third and fifth rotation axes.

7. A spectrometer as claimed in claim 1, wherein said detector is rotatably mounted about a pivot of said link, said spectrometer further comprising a lever integral with said detector, and a shaft, the axis of which is integral with said main arm, the axes of said shaft and said pivot being equidistant from said third rotation axis, and said lever having a groove for receiving said shaft.

* * * * *